United States Patent
Asai

(10) Patent No.: US 8,898,866 B2
(45) Date of Patent: Dec. 2, 2014

(54) CLIP

(75) Inventor: Osamu Asai, Okazaki (JP)

(73) Assignee: Daiwa Kasei Kogyo Kabushiki Kaisha, Aichi-ken (JP)

( * ) Notice: Subject to any disclaimer, the term of this patent is extended or adjusted under 35 U.S.C. 154(b) by 15 days.

(21) Appl. No.: 13/362,845

(22) Filed: Jan. 31, 2012

(65) Prior Publication Data
US 2012/0192386 A1    Aug. 2, 2012

(30) Foreign Application Priority Data

Feb. 1, 2011    (JP) .................................. 2011-019659

(51) Int. Cl.
| A44B 1/04 | (2006.01) |
| F16B 21/08 | (2006.01) |
| B60R 13/02 | (2006.01) |
| F16B 5/06 | (2006.01) |

(52) U.S. Cl.
CPC ........... F16B 21/086 (2013.01); *B60R 13/0206* (2013.01); *F16B 5/065* (2013.01)
USPC ................ 24/292; 24/453; 24/628; 248/27.3; 411/509; 411/510

(58) Field of Classification Search
USPC ............. 248/27.3, 71; 24/458, 297, 453, 292, 24/581.1, 628; 411/508, 509, 510, 908
See application file for complete search history.

(56) References Cited

U.S. PATENT DOCUMENTS

| 3,790,923 | A | * | 2/1974 | Mathe ............................ 439/557 |
| 4,406,033 | A | * | 9/1983 | Chisholm et al. .................... 16/4 |
| 4,687,164 | A | * | 8/1987 | Bakhaus et al. ............. 248/27.3 |
| 4,716,633 | A | * | 1/1988 | Rizo ................................ 24/453 |
| 5,173,026 | A | * | 12/1992 | Cordola et al. ............... 411/508 |
| 5,319,839 | A | * | 6/1994 | Shimajiri ......................... 24/453 |
| 5,704,753 | A | * | 1/1998 | Ueno ............................ 411/509 |
| 5,765,959 | A | * | 6/1998 | Shioda .......................... 403/199 |
| 5,857,244 | A | * | 1/1999 | Edwards et al. ................. 24/297 |
| 6,209,178 | B1 | * | 4/2001 | Wiese et al. ..................... 24/458 |
| 6,264,393 | B1 | * | 7/2001 | Kraus ........................... 403/282 |
| 6,305,055 | B1 | * | 10/2001 | Castro ............................. 24/458 |
| 6,443,679 | B1 | * | 9/2002 | Schwarz ....................... 411/352 |
| 6,594,870 | B1 | * | 7/2003 | Lambrecht et al. ............. 24/297 |
| 6,916,145 | B2 | * | 7/2005 | Lydan ........................... 411/510 |
| 6,974,292 | B2 | * | 12/2005 | Hansen ......................... 411/508 |
| 7,033,121 | B2 | * | 4/2006 | Kirchen .......................... 411/48 |
| 7,114,221 | B2 | * | 10/2006 | Gibbons et al. ................. 24/289 |
| 7,152,281 | B2 | * | 12/2006 | Scroggie ......................... 24/297 |
| 7,188,393 | B2 | * | 3/2007 | Kawai ............................. 24/297 |
| 7,198,315 | B2 | * | 4/2007 | Cass et al. ....................... 296/29 |
| 7,328,489 | B2 | * | 2/2008 | Leverger et al. ................ 24/453 |

(Continued)

FOREIGN PATENT DOCUMENTS

| JP | 2005-009668 | 1/2005 |
| JP | 2007-120529 A | 5/2007 |

*Primary Examiner* — Bradley Duckworth
(74) *Attorney, Agent, or Firm* — Christensen Fonder P.A.

(57) ABSTRACT

A clip capable of connecting to the panel member may include a clip body and a sealing body. The clip body includes an anchor that is capable of being engaged with an attaching hole formed in the panel member, and a support portion that is arranged and constructed to be pressed to a surface of the panel member when the anchor is engaged with the attaching hole of the panel member. The sealing body includes a lip portion that is positioned in an inner side of an outer circumference of the support portion.

7 Claims, 3 Drawing Sheets

(56) References Cited

U.S. PATENT DOCUMENTS

| | | | |
|---|---|---|---|
| 8,221,041 B2* | 7/2012 | Hauser | 411/349 |
| 8,316,514 B2* | 11/2012 | Sano | 24/297 |
| 8,393,058 B2* | 3/2013 | Okada et al. | 24/297 |
| 8,403,356 B2* | 3/2013 | Tago et al. | 280/728.2 |
| 2003/0159256 A1* | 8/2003 | Clarke | 24/297 |
| 2005/0150087 A1* | 7/2005 | Lydan | 24/297 |
| 2006/0000064 A1* | 1/2006 | Leverger et al. | 24/297 |
| 2006/0099051 A1* | 5/2006 | Moerke | 411/508 |
| 2008/0052878 A1* | 3/2008 | Lewis et al. | 24/297 |
| 2009/0265900 A1* | 10/2009 | Okada et al. | 24/458 |
| 2010/0293761 A1* | 11/2010 | Koike et al. | 24/458 |
| 2010/0293762 A1* | 11/2010 | Nakagawa | 24/458 |
| 2011/0113598 A1* | 5/2011 | Hofmann et al. | 24/458 |
| 2012/0317757 A1* | 12/2012 | Risdale et al. | 24/458 |
| 2013/0117969 A1* | 5/2013 | Mazur | 24/292 |

* cited by examiner

CLIP

BACKGROUND OF THE INVENTION

1. Field of the Invention

The present invention relates to a clip (fastener) capable of connecting to a subject member (e.g. a body panel) of a vehicle. More particularly, the present invention relates to a sealing clip capable of connecting to a subject member of a vehicle via an attaching hole formed in the subject member and capable of sealing the attaching hole.

2. Description of Related Art

A known sealing clip is taught by, for example, Japanese Laid-Open Patent Publication No. 2005-9668. The known clip includes a clip body and a sealing body that is integrally formed in the clip body. The clip body has an anchor and is made of a highly-rigid resinous material. Conversely, the sealing body has an annular shape and is made of a flexible resinous material. The sealing body is integrated with an outer circumference of a base portion of the clip body, so as to surround the anchor of the clip body. Further, the sealing body has a flared (dish-shaped) lip portion. When the clip is connected to a vehicle body panel by inserting the anchor into an attaching hole formed in the body panel, the lip portion of the sealing body can closely contact a surface of the body panel, so that the attaching hole can be sealed. Thus, rainwater, dust or other such material can be prevented from entering a vehicle interior through the attaching hole.

However, in the known clip, the flexible sealing body (the lip portion) is positioned in the outer circumference of the base portion of the clip body. Therefore, the sealing body can be easily subjected to an external force, in particular, when the clip is packaged or conveyed or when the clip is connected to the vehicle body panel. When the sealing body is applied with the external force, the lip portion of the sealing body can be deformed or damaged. This may lead to reduced sealing performance of the sealing body after the clip is connected to the vehicle body panel.

Thus, there is a need in the art for improved sealing clips.

SUMMARY OF THE INVENTION

For example, in one embodiment of the present invention, a clip is capable of connecting to the panel member, which may include a clip body and a sealing body. The clip body includes an anchor that is capable of being engaged with an attaching hole formed in the panel member, and a support portion that is arranged and constructed to be pressed to a surface of the panel member when the anchor is engaged with the attaching hole of the panel member. The sealing body includes a lip portion that is positioned in an inner side of an outer circumference of the support portion.

According to the clip of the present invention, the lip portion of the sealing body is positioned in the inner side of the distal end portion of the dish-shaped portion of the clip body. Therefore, the lip portion of the sealing body can be always protected by the dish-shaped portion of the clip body. Therefore, the lip portion of the sealing body can be effectively prevented from being deformed or damaged during a packaging operation of the clip or a connecting operation of the clip body to the panel member. As a result, sealing performance of the sealing body cannot be reduced after the clip is connected to the panel member.

Additional objects, features and advantages of the present invention will be readily understood after reading the following detailed description together with the accompanying drawings and the claims.

DETAILED DESCRIPTION OF THE INVENTION

A detailed representative embodiment of the present invention will be described with reference to FIGS. 1 to 6.

Figure 1:
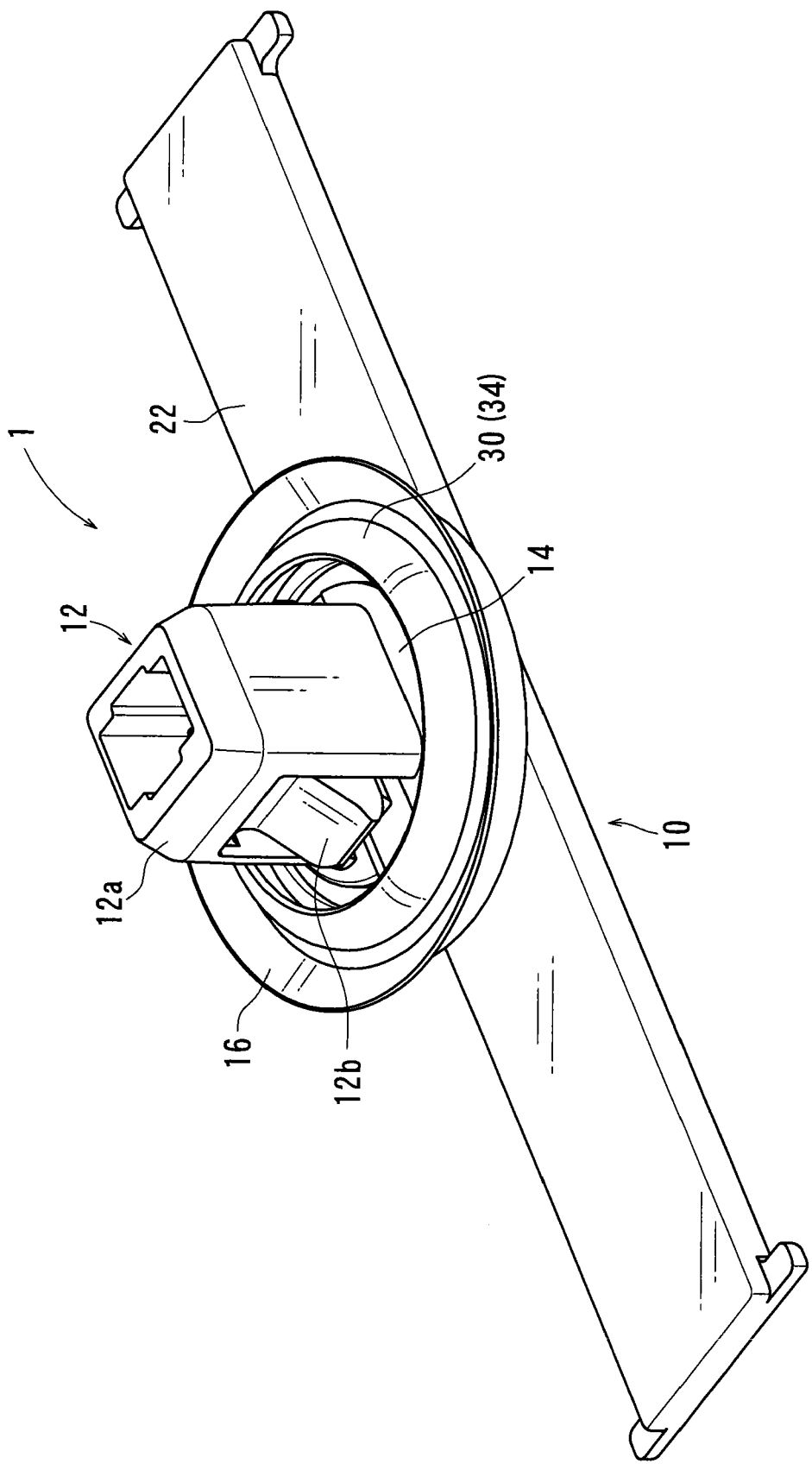
FIG. 1 is a perspective view of a clip according to a representative embodiment of the present invention.

A representative sealing clip 1 (which will be hereinafter simply referred to as a clip 1) is shown in FIGS. 1 to 6. The clip 1 is intended to attach a wiring harness (not shown) to a panel member (not shown), e.g., a body panel of a vehicle. As best shown in FIG. 1, the clip 1 includes a clip body 10 and a sealing body 30. The clip body 10 may preferably be made of a relatively highly-rigid resinous material such as polyacetal (e.g., polyoxymethylene (POM)) and may preferably be integrally formed. Conversely, the sealing body 30 may preferably be made of a flexible resinous material such as a thermoplastic elastomer (TPE) having an increased sealing or watertight performance. Further, the clip body 10 and the sealing body 30 may preferably be integrally formed by a multiple-color molding method (a two-color molding method in this embodiment).

The clip body 10 may preferably composed of an anchor 12, a dish-shaped (annular flared) portion 16 (a support portion), and a wiring harness retainer portion 22 having an elongated plate-shape. The anchor 12 may preferably be composed of a pillar 12a and a pair of elastic strips 12b. The pillar 12a is projected upwardly from an upper surface of a base portion 14 of the clip body 10 (which portion may be referred to as a base portion 14 of the anchor 12) and has a rectangular shape in transverse cross section. The elastic strips 12b are formed in opposite sides of the pillar 12a and are capable of being oppositely flexed inward and outward with respect to the pillar 12a.

In order to attach the wiring harness to the panel member, the clip 1 is disposed on the wiring harness such that the wiring harness retainer portion 22 can extend along the wiring harness. Thereafter, the wiring harness retainer portion 22 is connected to the wiring harness using a binding tape (not shown), so that the clip 1 can be integrated with the wiring harness. Subsequently, the anchor 12 of the clip body 10 is pushed into an attaching hole (not shown) formed in the panel member. Upon insertion of the anchor 12 into the attaching hole, the elastic strips 12b can be introduced into the attaching hole with the pillar 12a while being respectively oppositely flexed toward a central axis C of the pillar 12a (which axis may be referred to as a central axis C of the anchor 12), so as to elastically engage a periphery of the attaching hole. Thus, the clip 1 (the clip body 10) can be securely connected to the panel member. As a result, the wiring harness may be attached to the panel member via the clip 1.

Next, the dish-shaped portion 16 and the wiring harness retainer portion 22 of the clip body 10 and the sealing body 30 will be described in detail.

Figure 5:
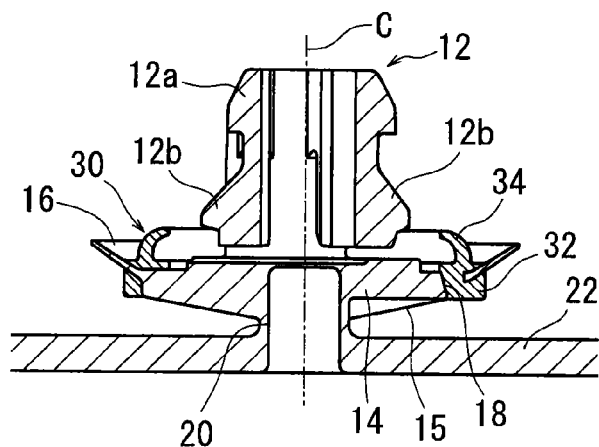
FIG. 5 is a partially vertical cross-sectional view of the clip.

First, the dish-shaped portion 16 of the clip body 10 may preferably have an annular (circular) shape. Further, as best shown in FIG. 5, the dish-shaped portion 16 may be projected obliquely upward and outward from an outer circumference of the base portion 14 of the clip body 10, so as to surround the anchor 12 (the pillar 12a). The dish-shaped portion 16 is arranged and constructed such that an outer circumferential portion of thereof can be pressed to an outer surface of the panel member when the clip body 10 (the clip 1) is connected to the panel member. Thus, the dish-shaped portion 16 may function to stabilize the clip body 10 when the clip body 10 is connected to the panel member.

Figure 4:
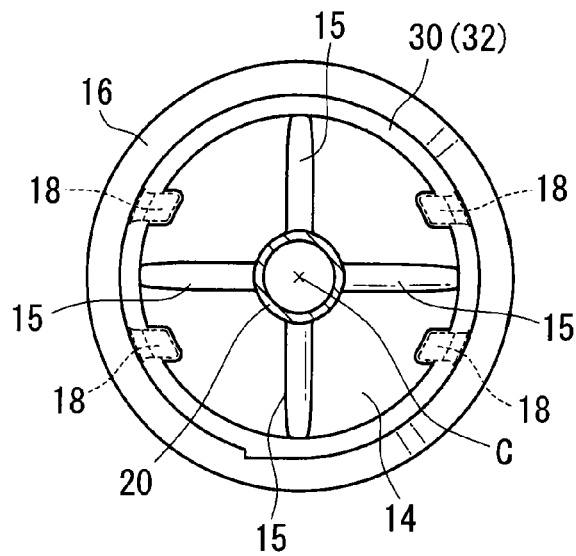
FIG. 4 is a cross-sectional view taken along line IV-IV of FIG. 3.

As best shown in FIG. 5, the wiring harness retainer portion 22 of the clip body 10 may be positioned below the base portion 14 of the clip body 10 and may be connected to the base portion 14 via a thinned neck portion 20. The wiring harness retainer portion 22 may preferably be extended laterally oppositely from the neck portion 20. Further, the base portion 14 may preferably have a plurality of (four in this embodiment) reinforcement ribs 15 that are formed in a lower surface thereof (FIG. 4). The ribs 15 may be arranged to extend radially outwardly from the neck portion 20.

Figure 2:
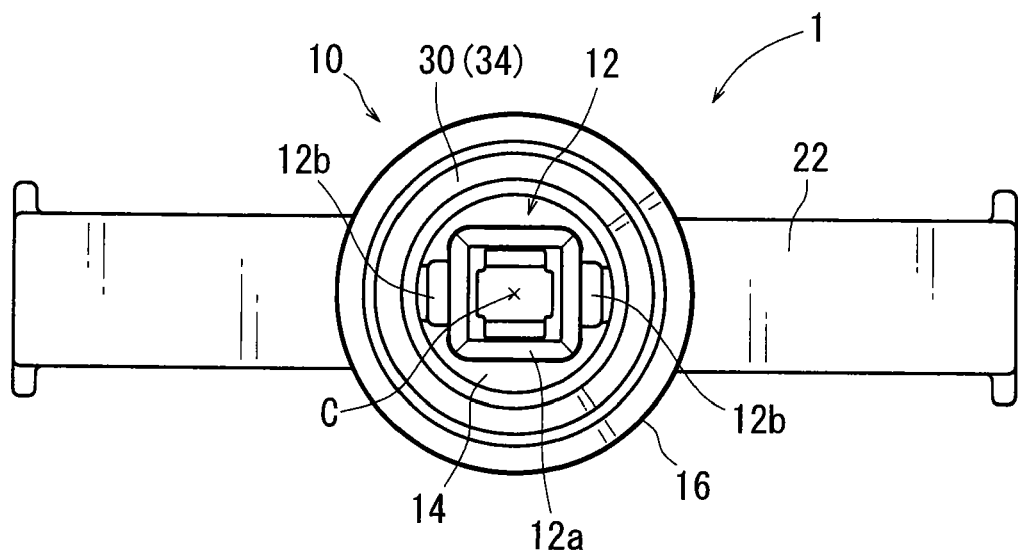
FIG. 2 is a plan view of the clip.
Figure 3:
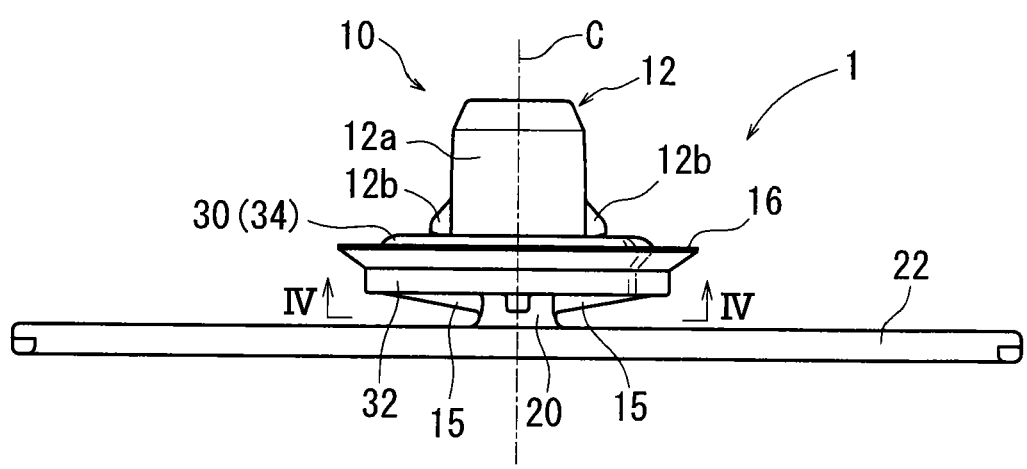
FIG. 3 is an elevational view of the clip.
Figure 6:
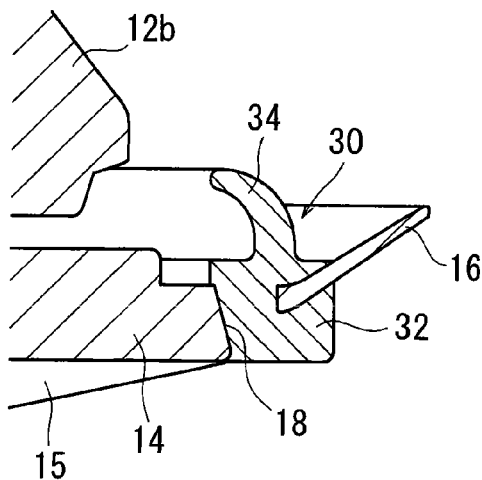
FIG. 6 is a partially enlarged view of FIG. 5.

Further, the sealing body 30 may preferably be integrated with the base portion 14 of the clip body 10 by the multiple-color molding method. As shown in FIG. 2, the sealing body 30 may have an annular shape that is centered on the central axis C of the anchor 12. As shown in FIGS. 5 and 6, the sealing body 30 may include a joining portion 32 and a lip portion 34. Further, the sealing body 30 is arranged and constructed such that the lip portion 34 thereof can contact the outer surface of the panel member when the clip body 10 is connected to the panel member. As previously described, the sealing body 30 is made of the flexible resinous material (e.g., TPE). Therefore, the lip portion 34 can elastically contact the outer surface of the panel member, so that the attaching hole into which the anchor 12 is inserted can be reliably sealed.

The joining portion 32 of the sealing body 30 may preferably be continuously formed in the outer circumference of the base portion 14 of the clip body 10 while an annular proximal end portion of the dish-shaped portion 16 is embedded therein (FIGS. 5 and 6). Further, as best shown in FIG. 4, the base portion 14 may have a plurality of (four in this embodiment) through holes 18 formed in a circumferential portion thereof, so that the joining portion 32 of the sealing body 30 can be continuous from an upper surface of the dish-shaped portion 16 to a lower surface of the dish-shaped portion 16 via the through holes 18.

As shown in FIGS. 5 and 6, the lip portion 34 of the sealing body 30 may be integrally formed in the support portion 32 of the sealing body 30, so as to be projected upwardly therefrom. Further, an annular distal end portion of the lip portion 34 may be bent or curved toward the central axis C of the anchor 12 (which axis corresponds to a center of the dish-shaped portion 16). The lip portion 34 (the sealing body 30) thus formed may be positioned in an inner side of an outer circumference of the dish-shaped portion 16.

As previously described, the clip body 10 may preferably be made of the relatively highly-rigid resinous material (e.g., POM). Conversely, the sealing body 30 may preferably be made of the flexible resinous material (e.g., TPE). The sealing body 30 may preferably be postformed on the clip body 10 that is previously formed. Further, because the base portion 14 of the clip body 10 has the through holes 18, the sealing body 30 can be efficiently postformed on the clip body 10 by simply injecting a molten resinous material (e.g., molten TPE) from one side (an upper surface side or a lower surface side) of the base portion 14.

According to the clip 1 of the present embodiment, the lip portion 34 (the sealing body 30) made of the flexible resinous material is positioned in the inner side of the outer circumference of the dish-shaped portion 16 made of the relatively highly-rigid resinous material. That is, the lip portion 34 of the sealing body 30 can be constantly protected by the dish-shaped portion 16. Therefore, the lip portion 34 can be effectively prevented from being deformed or damaged when the clip 1 is packaged and conveyed or when the clip 1 is connected to the panel member. As a result, sealing performance of the sealing body 30 cannot be reduced after the clip 1 is connected to the panel member.

In addition, the distal end portion of the lip portion 34 is bent or curved inwardly. Therefore, when the clip body 10 is connected to the panel member, the lip portion 34 of the sealing body 30 can be reliably flexed inwardly toward the center of the dish-shaped portion 16, i.e., the lip portion 34 can be effectively prevented from being partially flexed outwardly. As a result, when the clip body 10 is connected to the panel member, the lip portion 34 can reliably contact the outer surface of the panel member, so that the attaching hole can be reliably sealed.

Further, the wiring harness retainer portion 22 of the clip body 10 is connected to the base portion 14 via the thinned neck portion 20. Therefore, an external force applied to the wiring harness retainer portion 22 from the wiring harness can be effectively reduced or dampened by the neck portion 20, so as to be substantially prevented from being transmitted to the base portion 14. As a result, the sealing performance of the sealing body 30 can be effectively prevented from being changed by the external force.

Naturally, various changes and modifications may be made to the present invention without departing from the scope of the invention. For example, in the embodiment, the distal end portion of the lip portion 34 of the sealing body 30 is bent or curved inwardly. However, the lip portion 34 of the sealing body 30 can be entirely inclined inwardly. In addition, the lip portion 34 of the sealing body 30 can be replaced with a split lip portion.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A clip capable of connecting to a panel member, comprising:
    a clip body made of a first resinous material, and
    a sealing body made of a second resinous material,
        wherein the clip body includes an anchor that is capable of being engaged with an attaching hole formed in the panel member, and a support portion that is arranged and constructed to be pressed to a surface of the panel member when the anchor is engaged with the attaching hole of the panel member, and
        wherein the sealing body includes a lip portion that is configured to contact the surface of the panel member and is positioned in a radially inner side of an outer circumference of the support portion,
        wherein the sealing body is integrally formed in the clip body, and wherein the lip portion of the sealing body is shaped such that a distal end portion thereof is curved toward a center of the support portion.

2. The clip as defined in claim 1, wherein the sealing body further includes a joining portion that is integrally formed in a base portion of the clip body while a proximal end portion of the support portion of the clip body is embedded therein, and wherein the lip portion is formed along the joining portion.

3. The clip as defined in claim 1, wherein the first resinous material of the clip body is made of a rigid resinous material, and the second resinous material of the sealing body is made of a flexible resinous material, and wherein the clip body and the sealing body are integrally formed by a multiple-color molding method.

4. The clip as defined in claim 2, wherein the base portion of the clip body has a plurality of through holes formed therein, and wherein the joining portion of the sealing body is continuous from an upper surface of the support portion to a lower surface of the support portion via the through holes.

5. The clip as defined in claim 1, wherein the second resinous material is more flexible than the first resinous material.

6. The clip as defined in claim 1, wherein the clip body and the sealing body are integrally formed.

7. A clip capable of connecting to a panel member, comprising:
- a clip body, and
- a sealing body,
- wherein the clip body includes an anchor that is capable of being engaged with an attaching hole formed in the panel member, and a support portion that is arranged and constructed to be pressed to a surface of the panel member when the anchor is engaged with the attaching hole of the panel member, the support portion extending radially outward from a central axis, and
- wherein the sealing body includes a lip portion that is configured to contact the surface of the panel member and is positioned in a radially inner side of an outer circumference of the support portion, the lip portion being shaped such that a distal end portion thereof is curved radially inward toward the central axis, and
- wherein the sealing body is integrally formed in the body clip body.

* * * * *